United States Patent
Lekovic et al.

(10) Patent No.: US 7,776,934 B2
(45) Date of Patent: Aug. 17, 2010

(54) ONE-COMPONENT POLYURETHANE FOAM COMPOSITIONS AND METHODS FOR THEIR USE

(75) Inventors: Huzeir Lekovic, Troy, MI (US); Ali El-Khatib, Dearborn, MI (US)

(73) Assignee: Dow Global Technologies Inc., Midland, MI (US)

(*) Notice: Subject to any disclaimer, the term of this patent is extended or adjusted under 35 U.S.C. 154(b) by 615 days.

(21) Appl. No.: 11/707,219

(22) Filed: Feb. 13, 2007

(65) Prior Publication Data

US 2007/0197672 A1    Aug. 23, 2007

Related U.S. Application Data

(60) Provisional application No. 60/775,673, filed on Feb. 22, 2006.

(51) Int. Cl.
*C08G 18/22* (2006.01)

(52) U.S. Cl. .............. 521/125; 521/129; 521/130; 521/131; 521/137; 521/159; 521/170

(58) Field of Classification Search ........... 521/129, 521/130, 131, 137, 159, 170, 125
See application file for complete search history.

(56) References Cited

U.S. PATENT DOCUMENTS

| | | | |
|---|---|---|---|
| 3,751,392 A | 8/1973 | Olstowski | |
| 4,256,847 A | 3/1981 | Spector | |
| 4,315,078 A | 2/1982 | Anorga | |
| 4,624,996 A | 11/1986 | Rizk | |
| 4,625,012 A | 11/1986 | Rizk | |
| 4,719,267 A | 1/1988 | Rizk et al. | |
| 4,780,520 A | 10/1988 | Rizk et al. | |
| 4,908,161 A * | 3/1990 | Ashida | 252/609 |
| 4,968,724 A | 11/1990 | Mascioli | |
| 5,234,964 A | 8/1993 | Lin et al. | |
| 5,264,515 A * | 11/1993 | Cody et al. | 528/10 |
| 5,373,028 A | 12/1994 | McAfee et al. | |
| 5,922,809 A | 7/1999 | Bhat et al. | |
| 5,968,995 A | 10/1999 | Rizk et al. | |
| 6,133,398 A | 10/2000 | Bhat et al. | |
| 6,586,483 B2 * | 7/2003 | Kolb et al. | 521/91 |
| 6,706,774 B2 | 3/2004 | Munzenberger et al. | |
| 2002/0002210 A1 | 1/2002 | Brzoskowski et al. | |
| 2002/0133042 A1 | 9/2002 | Murrar et al. | |
| 2003/0229154 A1 * | 12/2003 | Kemmler et al. | 521/155 |

FOREIGN PATENT DOCUMENTS

| | | |
|---|---|---|
| GB | 1 035 927 | 5/1963 |
| JP | 07165871 A | 6/1995 |

* cited by examiner

*Primary Examiner*—John Cooney
(74) *Attorney, Agent, or Firm*—Gary C Cohn

(57) ABSTRACT

Foamable one-part polyurethane compositions contain a high functionality quasi-prepolymer and a hydrated salt. The foamable compositions are capable of expanding to 1000% or more of their original volume to form a low density, stable foam. The compositions are particularly useful as foam-in-place thermal or sound insulation materials, especially in vehicle applications.

8 Claims, No Drawings

ONE-COMPONENT POLYURETHANE FOAM COMPOSITIONS AND METHODS FOR THEIR USE

CROSS-REFERENCE TO RELATED APPLICATION

This application claims benefit of U.S. Provisional Application 60/775,673, filed 22 Feb. 2006.

BACKGROUND OF THE INVENTION

The present invention relates to one-part foamable polyurethane compositions and methods for their use.

Polyurethane foams are used in a wide variety of applications. The most typical method for making these foams involves bringing together a polyisocyanate component and a polyol component, and permitting them to react, foam and cure. Methods of this type require dispensing equipment, which tends to be expensive and requires a significant amount of space. These methods can release volatile materials that are present in the foam formulation, such as monomeric isocyanates, amine and tin catalysts, amine curing agents, and the like.

These methods are entirely suitable for making large foam buns, such as in a slabstock foam process. They are also suitable for making large quantities of molded foams of various types, such as flexible or semi-flexible molded foam, or rigid insulation foam as is commonly used in refrigeration devices and coolers. But these methods are less cost effective for some applications, notably those in which small quantities of foam are produced, in which the amount of foam that is needed is small, or in which it is difficult to provide good ventilation. Applications of this type include various automotive foam applications. Polyurethane foam is used in automotive applications to provide sound and vibration dampening, to seal joints or cavities to prevent water and oil penetration, provide energy absorption in case of a crash, or for other reasons. In many instances, the foam must be inserted into a small cavity on the frame or body of the vehicle (or some part or subassembly thereof). The volume of foam that is needed is usually small in each instance, and the total amount of foam that is needed per vehicle also tends to be small. The foam formulation often must be applied at close quarters, which can make ventilation difficult. Because of these difficulties, manufacturers often opt to use pre-formed foam, which must be manually inserted into place. It would be more desirable in many cases to apply a material that can foam in place, if costs and worker exposure issues could be addressed adequately.

One approach that could avoid the need for expensive equipment would be to provide a one-component foam formulation. One-component polyurethane formulations are known and used in some applications. For example, U.S. Pat. No. 5,817,860 describes a moisture-curable polyurethane that is useful in various sealant applications. U.S. Pat. No. 5,075,407 describes a one-component foamable polyurethane composition.

The difficulty in formulating a one-component polyurethane foam is to provide enough blowing agent to get good expansion, and at the same time create a composition that is storage-stable and cures only under defined circumstances. Most polyurethane foam is blown using water or a physical blowing agent. Water is very reactive with isocyanate groups, and so can be formulated into a one-component foam composition with great difficulty, if at all. The physical blowing agents tend to be too volatile to formulate into one-component compositions. Compositions containing physical blowing agents would need to be packaged under pressure, maintained under controlled temperature conditions, or both, in order to prevent the blowing agent from volatilizing prematurely.

Thus, attempts to make one-component polyurethane formulations have tended to follow one of two approaches. One approach is to rely on atmospheric moisture to provide the cure. Such an approach is described in U.S. Pat. No. 5,817, 860. As atmospheric moisture reacts with isocyanate groups in the formulation, carbon dioxide is generated and the formulation expands somewhat as it cures. However, the amount of expansion is not great, and a low density foam is not obtained.

A second approach involves "tying up" water so it is not available for reaction until specific conditions are met, notably an elevated temperature. This is the approach described in U.S. Pat. No. 5,075,407. Water is provided in the formulation, in the form of waters of hydration of a salt. The formulation is stable until heated to a temperature high enough that at least some of the waters of hydration are released.

Once released, the Water is available to react with the polyisocyanate, and expand and cure the foam. However, U.S. Pat. No. 5,075,407 reports volume expansions of up to only about 433% with this approach. This corresponds to a foam density of about 15 pounds/cubic foot (240 kg/m$^3$), which is much higher than is either necessary or desired. It therefore would be desirable to provide a method for producing low density polyurethane foam from a one-component foamable composition.

SUMMARY OF THE INVENTION

In one aspect, this invention is a one-component foamable polyurethane composition comprising a) an isocyanate-terminated quasi-prepolymer having an isocyanate content of from 15 to 27% by weight, the quasi-prepolymer having an average isocyanate functionality of from 2.6 to 3.5;

b) a hydrated salt of an alkali metal or of an alkaline earth metal, which hydrated salt loses at least one mole of water of hydration per mole of salt when exposed to at least one temperature in the range of from 80 to 190° C.; and c) at least one catalyst for the reaction between an isocyanate group and water, wherein the hydrated salt is present in an amount such that at least 0.5 equivalents of water of hydration are provided per equivalent of isocyanate groups in the quasi-prepolymer when the foamable polyurethane composition is heated to at least one temperature in the range of from 80 to 190° C.

The foamable composition of the invention is often storage stable for periods of months or more. When heated to at least one elevated temperature in the range of 80° C. to 190° C., the foamable composition rapidly cures to form low density polyurethane foam. Foam expansions of 2000% or higher are readily obtained.

This invention is also a method of making a rigid polyurethane foam, comprising heating a one-component foamable polyurethane composition containing an isocyanate-terminated prepolymer and a hydrated salt of an alkali or alkaline earth metal to a temperature from 80 to 190° C. such that the hydrated salt loses at least one mole of water of hydration per mole of salt and said released water of hydration reacts with isocyanate groups on the isocyanate-terminated prepolymer to expand and cure the composition, wherein a) the isocyanate-terminated quasi-prepolymer has an isocyanate content of from 15 to 27% by weight and an average isocyanate functionality of from 2.8 to 3.5;

b) the hydrated salt loses at least one mole of water per mole of salt when exposed to at least one temperature in the range of from 80 to 190° C. and c) the composition contains at least one catalyst for the reaction between an isocyanate group and water.

This invention is also a method of reinforcing a cavity in a vehicle, comprising placing the one-component foamable polyurethane composition of the invention into the cavity, and then exposing the polyurethane-forming composition to a temperature of from 80 to 190° C. such that the hydrated salt loses at least one water of hydration per mole of hydrated salt and the released water of hydration reacts with isocyanate groups on the isocyanate-terminated prepolymer to expand and cure the composition to form a polyurethane foam within and adhered to the cavity.

DETAILED DESCRIPTION OF THE INVENTION

The polyisocyanate component comprises an isocyanate-terminated quasi-prepolymer. By "quasi-prepolymer", it is meant a mixture of isocyanate-terminated compounds, some but not all of which contain urethane groups.

The quasi-prepolymer is characterized by having an NCO content of from 15 to 27% by weight. "NCO content" refers to proportion of the weight of the quasi-prepolymer that is made up of isocyanate (—NCO) groups. The NCO content is preferably from about 20 to 25% by weight. An NCO content of from 15 to 27% corresponds to an isocyanate equivalent weight of from about 155 to 280. An NCO content of from 20 to 25% by weight corresponds to an isocyanate equivalent weight of from 168 to 210.

The quasi-prepolymer is further characterized in having an average isocyanate functionality of from 2.6 to 3.5 isocyanate groups/molecule. A preferred isocyanate functionality is from 3.0 to 3.4 isocyanate groups/molecule.

The quasi-prepolymer represents the reaction product of at least one starting polyisocyanate compound and a polyol or polyol mixture, in which an excess of one mole of starting polyisocyanate is present per equivalent of hydroxyl groups provided by the polyol compound(s). A polyol mixture is a mixture of two or more polyols (i.e., compounds having at least 2 hydroxyl groups/molecule), or a mixture of at least one polyol and at least one monoalcohol. Typically, from 2 to 5 moles of the starting polyisocyanate are used per equivalent of hydroxyl group provided by the starting polyol or polyol mixture. More typically, from 3 to 4 moles of the starting polyisocyanate compound are used per equivalent of hydroxyl groups provided by the polyol or polyol mixture.

The starting materials and the relative proportions thereof are selected to produce a quasi-prepolymer having the required isocyanate functionality and isocyanate content. Average isocyanate functionality can be calculated from the number of moles of starting materials and the number of hydroxyl and isocyanate equivalents of the starting materials, as follows:

$$\frac{\text{NCO Equivalents} - \text{OH equivalents}}{\text{Moles OH compounds} + (\text{Moles NCO compound} - \text{OH equivalent})}$$

This formula assumes that a significant excess of polyisocyanate is used, so a negligible quantity of reaction products of a single polyisocyanate molecule with two or more hydroxyl-containing molecules are formed.

Suitable polyisocyanates that can be used in preparing the quasi-prepolymer include aromatic, aliphatic and cycloaliphatic polyisocyanates. Aromatic polyisocyanates are generally preferred based on cost, availability and properties imparted to the product polyurethane. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetra methylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4', 4"-triphenylmethane triisocyanate, polymethylene polyphenylisocyanates, hydrogenated polymethylene polyphenylisocyanates, toluene-2,4,6-triisocyanate, and 4,4'-dimethyldiphenylmethane-2,2', 5,5'-tetraisocyanate. Preferred starting polyisocyanates have an isocyanate functionality in excess of 2.0, such as from about 2.5 to about 4, especially from about 2.7 to about 3.8 and preferably from about 3.0 to about 3.5. Particularly preferred starting polyisocyanates include the so-called polymeric MDI products, which are a mixture of polymethylene polyphenylene isocyanates in monomeric MDI. Such polymeric MDI products are available from The Dow Chemical Company under the trade name PAPI®.

A polyol is a material having two or more hydroxyl groups that can react with an isocyanate group to form a urethane group. At least one polyol is used to make the quasi-prepolymer. A mixture of polyols may be used. A mixture of one or more polyols with one or more monoalcohols can also be used. A monoalcohol is often useful to help control the average isocyanate functionality in the quasi-prepolymer.

Suitable polyol(s) for making the quasi-prepolymer contains from 1.5 to 8, especially 1.8 to 6, and even more especially 2.0 to 4.5 hydroxyl groups per molecule, on average. The equivalent weight per hydroxyl group can vary widely, so long as the quasi-prepolymer has the desired equivalent weight and isocyanate content. The equivalent weight of each polyol may range from 31 to 3000 or more.

Suitable polyols for use in making the quasi-prepolymer include compounds such as alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), glycerine, trimethylolpropane, tertiary amine-containing polyols such as triethanolamine, triisopropanolamine, and ethylene oxide and/or propylene oxide adducts of ethylene diamine, toluene diamine and the like, polyether polyols, polyester polyols, and the like. Among the suitable polyether polyols are polymers of alkylene oxides such as ethylene oxide, propylene oxide and 1,2-butylene oxide, or mixtures of such alkylene oxides. Preferred polyethers are polypropylene oxides or polymers of a mixture of propylene oxide and a small amount (such as up to 12 weight percent) ethylene oxide. These preferred polyethers can be capped with up to 30% by weight ethylene oxide.

Polyester polyols are also suitable in making the prepolymer. These polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful.

Hydroxyl-functional polybutadiene polymers are also useful in making the prepolymer.

Monoalcohols such as ethanol, n-propanol, isopropanol, n-butanol, sec-butanol, t-butanol, 1-hexanol can be used in a polyol mixture. Other suitable monoalcohols include hydroxy-functional acrylates and methacrylates that contain an acrylate ($CH_2$=CH—C(O)—) or methacrylate ($CH_2$=C($CH_3$)—C(O)—) group and a hydroxyl group. Suitable hydroxy-functional acrylates and methacrylates include 2-hydroxyethyl acrylate, 2-hydroxyethyl methacrylate (HEMA), 2-hydroxypropyl acrylate, 2-hydroxypropyl methacrylate, 4-hydroxy-n-butyl acrylate, 2-hydroxy-n-butyl acrylate, 2-hydroxy-n-butyl methacrylate, 4-hydroxy-n-butyl methacrylate, poly(oxyethylene)- and/or poly(oxypropylene)-esters of acrylic or methacrylic acid wherein the number of oxyethylene and/or oxypropylene groups is preferably from 2 to 10, and the like.

The quasi-prepolymer is conveniently prepared by mixing the organic polyisocyanate with the polyol or polyol mixture and subjecting the mixture to conditions such that the hydroxyl groups react with isocyanate groups to form the prepolymer. The reaction is continued until the prepolymer composition attains a constant isocyanate content. Generally, the reaction time is at least 10 minutes to at most 48 hours. The temperature of the mixing and reaction step may vary over a large range, but generally is limited so that reactants do not decompose and the reaction proceeds at a practicable rate. A preferred temperature is from 20 to 75° C. The reactants are generally contacted under a dry atmosphere and preferably under nitrogen or other inert atmosphere.

The quasi-prepolymer may also be made by forming a prepblymer and blending the prepolymer with an additional quantity of the starting polyisocyanate compound.

A catalyst may be and preferably is used in making the quasi-prepolymer. Suitable catalysts include those described by U.S. Pat. No. 4,390,645. Representative catalysts include:
(a) tertiary amines, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine, 4,4'-(oxydi-2,1-ethanediyl)bis and triethylenediamine;
(b) tertiary phosphines, such as trialkylphosphines and dialkylbenzylphosphines;
(c) chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;
(d) acidic metal salts of strong acids, such as ferric chloride, stannic chloride, stannous chloride, antimony trichloride, bismuth nitrate and bismuth chloride;
(e) strong bases, such as alkali and alkaline earth metal hydroxides, alkoxides and phenoxides;
(f) alcoholates and phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols;
(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers such as manganese and cobalt naphthenate; and
(h) organometallic derivatives of tetravalent tin, trivalent and pentavalent As, Sb and Bi and metal carbonyls of iron and cobalt.

Catalysts are typically used in small amounts. For example, the total amount of catalyst used in making the prepolymer composition may be 0.0015 to 5, preferably from 0.01 to 1 percent by weight.

The foamable polyurethane composition contains a hydrated salt of an alkali metal or alkaline earth metal. By "hydrated", it is meant that the salt contains at least one water of hydration. The salt will generally correspond to the general formula $M_xA_y \cdot ZH_2O$, wherein M is an alkali metal or alkaline earth metal, A is an anion, x and y are numbers that reflect an electrostatically neutral salt and Z is a number of at least one. Z is preferably at least 2, such as from 2 to 12. Each water molecule associated with the salt unit structure is referred to herein as a "water of hydration". In addition, mixed metal salts can be used, including those corresponding to the general formula $M_xM^1_kA_y \cdot ZH_2O$, wherein $M^1$ represents a metal ion different from M (and which is not necessarily an alkali metal or alkaline earth metal ion), x, k and y are numbers that reflect an electrostatically neutral salt, and Z, M and A are as before.

The hydrated salt is one that loses at least one water of hydration per mole of salt when heated to at least one temperature in the range of from 80 to 190° C. Preferably, the hydrated salt loses at least one water of hydration per mole of salt when heated to at least one temperature in the range of from 120 to 190° C. A preferred hydrated salt loses at least 1.5, especially at least 2 waters of hydration per mole of salt when heated to at least one temperature within the range of from 120 to 190° C. The salt may lose additional water(s) of hydration when heated to a lower or higher temperature, although this is neither necessary nor preferred.

Loss of water of hydration is determined by heating the hydrated salt to the aforementioned temperature range under atmospheric pressure air or inert gas such as nitrogen, and determining the amount of water lost per mole of hydrated salt. Water loss can be determined gravimetrically, or by detecting a change in crystalline structure of the salt that often occurs as water(s) of hydration are lost.

The anion and cation of the hydrated salt each are suitably thermally stable and non-volatile within the temperature range of 20 to 220° C., and in particular do not volatilize or decompose to form a gas when heated to a temperature within such range.

Suitable hydrated salts include those of alkali metal and alkaline earth metal borates ($B_4O_7^-$), perborates ($BO_3^-$), citrates ($C_6H_5O_7^{3-}$), sulfates ($SO_4^{2-}$), stannates ($SnO_3^{2-}$), acetates ($C_2H_3O_2^-$) and the like.

Examples of suitable hydrated salts include sodium perborate tetrahydrate ($NaBO_3 \cdot 4H_2O$), sodium borate pentahydrate ($Na_2B_4O_7 \cdot 5H_2O$), sodium borate decahydrate ($Na_2B_4O_7 \cdot 10H_2O$), sodium citrate dihydrate ($Na_3C_6H_5O_7 \cdot 2H_2O$), potassium citrate monohydrate ($K_3C_6H_5O_7 \cdot H_2O$), sodium stannate trihydrate ($Na_3Sn_6O_3 \cdot 3H_2O$), magnesium sulfate heptahydrate ($MgSO_4 \cdot 7H_2O$), calcium sulfate dihydrate ($CaSO_4 \cdot 2H_2O$), aluminum potassium sulfate dodecahydrate ($AlKSO_4 \cdot 12H_2O$), and the like.

Typically, the salt will constitute from about 5 to about 25, especially from 7.5-15% of the total weight of the foamable composition.

The foamable polyurethane composition may contain various ingredients in addition to the quasi-prepolymer and hydrated salt. Among these are surfactants, catalysts, plasticizers, rubbers, fillers, crosslinkers, chain extenders, colorants, preservatives, odor masks, flame retardants, biocides, antioxidants, UV stabilizers, antistatic agents, thixotropic agents and cell openers. Additives of particular interest include surfactants, plasticizers and/or rubbers, fillers and catalysts. The composition is preferably substantially devoid of blowing agents and blowing agent precursors other than the hydrated salt. In particular, the composition preferably contains no more than about 0.2%, especially no more than about 0.1%, by weight water (other than the waters of hydration associated with the hydrated salt).

A surfactant is preferably included in the foamable polyurethane composition to help stabilize the foam as it expands and cures. Examples of surfactants include nonionic surfactants and wetting agents, such as those prepared by the sequential addition of propylene oxide and then ethylene oxide to propylene glycol, solid or liquid organosilicones and polyethylene glycol ethers of long chain alcohols. Ionic surfactants such as tertiary amine or alkylolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as Tegostab (trademark of Goldschmidt Chemical Corp.) B-8462 and B-8404, and DC-198 and DC-5043 surfactants, available from Dow Corning.

Non-hydrolyzable liquid organosilicones are more preferred. When a surfactant is used, it is typically present in an amount of 0.0015 to 1 percent by weight of the foamable polyurethane composition.

The foamable polyurethane composition may contain a plasticizer and/or rubber. These materials can be added for several purposes. In some cases, they impart useful rheological properties to the composition. The quasi-prepolymer itself is often a liquid of moderate viscosity. A plasticizer and/or rubber can serve to increase the viscosity, even to the extent of forming a paste-like constituency. In some applications of particular interest, a high viscosity permits the composition to be applied into an open cavity and stay in place for a period of time until curing can be effected. Plasticizers and rubbers can be used to increase the flexibility, decrease the brittleness and increase the impact strength of the composition after it is foamed. As many of these plasticizers and rubbers are quite inexpensive, they can be used to reduce the cost of the composition.

A plasticizer or rubber is generally devoid of groups that react with the isocyanate groups present in the quasi-prepolymer. Examples of plasticizers include phthalates (e.g., dioctyl phthalate, diisooctyl phthalate, dimethyl phthalate, dibutyl phthalate and mixtures of phthalates, such as those sold by BASF Corporation, Mt Olive, N.J., under the trade name PLATINOL™ (such as Platinol™ 79P)), phosphates (e.g., tributyl phosphate, triphenyl phosphate and cresyl diphenyl phosphate), chlorinated biphenyls, and aromatic oils such as VYCUL™ U-V (sold by Crowley Chemicals) and Jayflex™ L9P (sold by Exxon Chemicals).

Rubbers are preferably provided as a liquid (either neat or as a solution) or low-melting solid (melting below 80° C.). Among the types of rubbers that are useful in this invention are styrene-butadiene rubbers, polybutadiene rubbers, EPDM (ethylene propylene diene monomer) rubbers, butadiene-nitrile rubbers, polyisoprene rubbers, acrylate-butadiene rubbers, polychloroprene rubbers, acrylate-isoprene rubbers, ethylene-vinyl acetate rubbers, polypropylene oxide rubbers, polypropylene sulfide rubbers, and thermoplastic polyurethane rubbers. A rubber may be dissolved in a suitable solvent. A particularly suitable solvent is a plasticizer as described above.

Generally, the plasticizer and/or rubber, when present, will together constitute from 1 percent to at most 60, preferably from 10 to 50, and more preferably from 20 to 40, percent by weight of the foamable polyurethane composition.

If a rubber is included in the composition, the compdsition may further include a rubber crosslinker, such as sulfur, and may further include an accelerator or catalyst for the rubber crosslinking reaction, such as zinc oxide.

One or more fillers may also be present in the foamable composition. A filler may help modify the composition's rheological properties in a beneficial way, reduce cost and impart beneficial physical properties to the foam. Suitable fillers include particulate inorganic and organic materials that are stable and do not melt at the temperatures encountered as the foamable composition is cured. Examples of suitable fillers include kaolin, montmorillonite, calcium carbonate, mica, wollastonite, talc, high-melting thermoplastics, glass, fly ash, carbon black titanium dioxide, iron oxide, chromium oxide, azo/diazo dyes, phthalocyanines, dioxazines and the like. The filler may impart thixotropic properties to the foamable polyurethane composition. Fumed silica is an example of such a filler. When used, fillers advantageously constitute from about 0.5 to about 30%, especially about 0.5 to about 10%, by weight of the composition.

Another additive of particular interest is a catalyst for the reaction between the isocyanate groups of the quasi-prepolymer with the water released from the hydrated salt. Catalysts of the types described before in connection with the preparation of the quasi-prepolymer are generally suitable. Organotin and/or tertiary amine catalysts are preferred. A catalyst of particular interest to this invention is dimorpholinodiethyl ether, which can be used alone or in conjunction with another catalyst, such as an organotin catalyst. The catalyst may be encapsulated or otherwise treated to help prevent premature curing of the composition, particularly if the composition contains a crosslinker or chain extender. If the catalyst is encapsulated, the encapsulant is advantageously a material that melts or degrades when heated to a temperature range of from 50 to 190° C., especially from 80 to 150° C., so that the active catalyst becomes released and available to promote the curing and foaming reactions when the composition is heated to such a temperature.

The foamable composition may contain a chain extender or crosslinker. A chain extender is a material having exactly two isocyanate-reactive groups/molecule, whereas a crosslinker contains on average greater than two isocyanate-reactive groups/molecule. In either case, the equivalent weight per isocyanate-reactive group can range from about 30 to about 300, but is preferably from about 30 to about 250. The isocyanate-reactive groups are preferably aliphatic alcohol, primary amine or secondary amine groups. Crosslinkers or chain extenders containing primary or secondary amino groups are preferred. In order to prevent premature curing, it is preferred to employ some means to prevent the isocyanate-reactive groups on the chain extender or crosslinker from reacting with the isocyanate groups on the quasi-prepolymer until the mixture is heated above some threshold temperature. Suitable such means include, for example, (1) selecting a chain extender or crosslinker that melts at a temperature from 50 to 220° C., (2) encapsulating the chain extender or crosslinker, as described above with respect to the catalyst, (3) blocking the isocyanate groups (particularly amino groups) with a blocking group that dissociates at a temperature of from 50 to 220° C. to generate an isocyanate-reactive group, as well as other methods. A crosslinker of particular interest is dicyanodiamide (cyanoguanidine), which has a melting temperature in the range of 205-210° C.

A surprising aspect of the invention is that salts that are strong oxidants, in particular borate and perborate salts, can in certain circumstances be formulated with amine compounds such as tertiary amine-containing catalysts and amino-functional chain extenders or crosslinkers to form a storage stable foamable composition. Strong oxidants tend to react with amine compounds to form peroxides and other undesired by-products. When a strongly oxidative salt is present, amine-containing materials are preferably either encapsulated as described before, are solids having an elevated melting temperature, or both. When encapsulated, the encapsulant advantageously melts or decomposes at a temperature of not less than 50° C., more preferably not less than 100° C. and even more preferably not less than 150° C. Similarly, a solid amine-containing material preferably melts at a temperature of not less than 50° C., more preferably not less than 100° C. and even more preferably not less than 150° C.

The foamable polyurethane composition contains enough of the quasi-prepolymer to provide an isocyanate index of from 40 to 200, preferably 45 to 130 and especially from 70 to 120. Isocyanate index is 100 times the ratio of equivalents of polyisocyanate groups to equivalents of isocyanate-reactive groups in the foamable polyurethane composition, including those provided by any chain extender or crosslinker that may be present, as well as the water of hydration that is released by the hydrated salt. However, in determining isocyanate index, only waters of hydration that are released within the temperature range of from 80 to 190° C. are considered, and each mole of water released is considered as two equivalents (as a mole of water consumes two isocyanate groups). Generally, the prepolymer will constitute from 35 to 95% of the total weight of the foamable composition. More typically, it will constitute from 50 to 85% of the total weight of the foamable composition.

Although it is preferred that no additional blowing agent be included in the foamable polyurethane composition, it is within the scope of the invention to include an additional physical or chemical blowing agent. Among the physical blowing agents are various fluorocarbons, hydrofluorocarbons, chlorocarbons, chlorofluorocarbons and hydrochlorofluorocarbons. Chemical blowing agents are materials that decompose or react (other than with isocyanate groups) at elevated temperatures to produce carbon dioxide and/or nitrogen.

The foamable polyurethane composition can be prepared by first preparing the quasi-prepolymer, and then blending the quasi-prepolymer with the remaining ingredients. Blending conditions are selected to prevent premature reaction of the isocyanate groups with any chain extender and/or crosslinker that may be present, and to prevent release of water of hydration from the hydrated salt. In generally, these events can be avoided or minimized by maintaining temperatures below about 50° C., especially below about 40° C., during the blending process. A wide variety of mixing devices can be used to form the foamable composition.

It is possible to incorporate some of the ingredients during the preparation of the quasi-prepolymer, provided that such ingredients do not react under the conditions of the prepolymer-forming reaction. Examples of ingredients that can be incorporated in this manner include surfactants, plasticizers, rubbers and fillers. It is preferred to blend the hydrated salt, catalyst, chain extender and crosslinkers into a previously-formed quasi-prepolymer.

The resulting foamable polyurethane composition is generally storage stable for several months when maintained in an inert atmosphere (such as nitrogen or argon) at temperatures at or below 50° C.

Foam is prepared by heating the foamable polyurethane composition to a temperature of at least 80° C. up to about 220° C., and allowing the composition to expand and cure. At such temperatures, water of hydration is released from the hydrated salt, although the particular temperature within this range that is needed will depend on the particular hydrated salt that is used. The water will typically begin to react with isocyanate groups spontaneously once it is released from the salt, and the exothermic nature of this reaction often will further heat the curing mass and drive the cure. The applied heat, or heat generated by the exothermic reaction of the water with isocyanate groups, causes any encapsulant that may be used to encapsulate the catalyst, crosslinker or chain extender to melt or decompose, causes any blocked amine to become deblocked, and causes any solid crosslinker or chain extender to melt and become available for reaction. The reaction of amine-functional crosslinkers and chain extenders in most cases will similarly proceed spontaneously once these materials become available for reaction, due, for example, to their becoming deblocked or melted or because their encapsulant melts or degrades.

A molecule of released water reacts with an isocyanate group in known manner to form an amine (with release of a carbon dioxide molecule). The amine then reacts with a second isocyanate group to form a urea linkage. Thus, the water-isocyanate reaction is responsible for both curing and generation of gasses to expand the mixture. Because the quasi-prepolymer has a high isocyanate functionality, a cross-linked polymer structure is formed, creating a stable foam. The foamable polyurethane composition typically expands to at least 1000% (to 10 times) its initial volume, although the level of expansion depends somewhat on the amount of hydrated salt that it contains, and may be affected by rheological properties of the composition (notably viscosity). Preferably, the composition expands to at least 2000% (to 20 times) of its initial volume. More preferably, the composition expands to at least 2500% (to 25 times) its initial volume. The composition may expand by as much as 4000%, but preferably does not expand by more than about 3300%. The cured foam typically has a density of from 1 to about 7 pounds/cubic foot (16-102 kg/m$^3$), preferably from about 1.5 to about 3.5 pounds/cubic foot (24-51 kg/m$^3$). An especially preferred foam density is from 1.7 to 2.5 pounds/cubic foot (27-40 kg/m$^3$).

Applications of particular interest are foam-in-place applications in which the foamable polyurethane composition is applied to a substrate and then cured to form a foam that is attached to the substrate. In many applications of interest, the substrate cannot contain fluids, because of its shape or orientation. In these applications (as well as others), the foamable polyurethane composition can be formulated as a low-melting or low-softening solid, or as a paste. In the former case, the composition can be heated slightly above room temperature (e.g., 30-50° C.) to soften it for application. After application, it can be cooled to re-solidify it in place until such time as the composition is to be heated to a higher temperature for cure. In the latter case, the composition can be applied to the substrate using a wide range of equipment, and adheres to the substrate until such time as it is ready to be cured. For purposes of this invention, "paste" is used to denote a semi-solid material that is easily deformable (such as under thumb pressure) but is sufficiently cohesive that at room temperature (~22° C.) it does not run off a substrate under force of gravity.

The foamable polyurethane composition is particularly suitable for a variety of automotive applications. Foams are commonly used in automobiles to provide sound and vibration dampening, for structural reinforcement, as injury abatement means, and the like. In many of these applications, the foamable composition of the invention is conveniently applied to an automotive part, sub-assembly or assembly where foam is needed. The part, sub-assembly or assembly often forms all or a portion of the frame and/or body of the vehicle, which is coated with a so-called "E-coat" that undergoes a bake cure. In such cases, it is often convenient to cure the foamable polyurethane composition at the time the coating is cured. The foamable polyurethane composition of the invention can be formulated as a paste or low-melting or low-softening solid which can be applied and remain in place until the baking step is conducted. The composition can be applied prior to, simultaneously with, or after the coating is applied, but before the coating is cured. The foamable polyurethane composition is then expanded at the same time the coating is baked.

The following examples are provided to illustrate the invention, but are not intended to limit the scope thereof. All parts and percentages are by weight unless otherwise indicated.

EXAMPLE 1

A quasi-prepolymer is prepared by heating a mixture of 5.45 parts of a trifunctional poly(propylene oxide) polyol (Voranol® 220-260, from Dow Chemical) having an equivalent weight of 216, 1.2 parts of n-butanol, and 63 parts of a polymeric MDI product having an isocyanate equivalent weight of 141 and an isocyanate functionality of 3.2 (PAPI® 20, from Dow Chemical). The mixture is heated to 70° C. under nitrogen with stirring until a constant NCO content of 24.4% is achieved. The resulting liquid quasi-prepolymer has an average isocyanate functionality of 3.3.

The quasi-prepolymer is cooled to approximately room temperature and blended with 18 parts of a linear phthalate plasticizer (Platinol® 711P, from BASF), 10 parts of sodium perborate tetrahydrate, 1 part of fumed silica, 0.35 part of an organosilicone surfactant (DC-198, from Air Products) and 1 part of an encapsulated dimorpholinodiethyl ether catalyst. The resulting foamable polyurethane composition is a paste that remains in place when applied to a vertical metal surface at 22° C.

Sodium perborate tetrahydrate releases four waters of hydration when heated to a temperature of about 130-150° C. Isocyanate index for this formulation is calculated to be approximately 77.

The foamable polyurethane composition is expanded by heating to 160° C. for 10 minutes. The mixture expands to about 3000% of its initial volume to form a stable foam.

EXAMPLE 2

A quasi-prepolymer is prepared by heating a mixture of 5.17 parts of Voranol® 220-260 polyol, 1.14 parts of n-butanol, 4.99 parts of a copolymer polyol having an equivalent weight of 2640 (Specflex® NC-700 from Dow Chemical) and 59.85 parts of PAPI® 20 polymeric MDI. The copolymer polyol is a dispersion of styrene-acrylonitrile copolymer particles in a polypropylene oxide). It contains about 43% dispersed copolymer particles. The mixture is heated to 70° C. under nitrogen with stirring until a constant NCO content of 23.6% is achieved. The resulting liquid quasi-prepolymer has an average isocyanate functionality of 3.3.

The quasi-prepolymer is cooled to approximately room temperature and blended with 17.1 parts of a linear phthalate plasticizer (Platinol® 711P, from BASF), 9.5 parts of sodium perborate tetrahydrate, 0.95 part of fumed silica, 0.35 part of DC-198 surfactant, and 1 part of the encapsulated dimorpholinodiethyl ether catalyst. The resulting foamable polyurethane composition is a paste that remains in place when applied to a vertical metal surface at 22° C.

Isocyanate index for this formulation is calculated to be approximately 76.6.

The foamable polyurethane composition is expanded by heating to 160° C. for 10 minutes. The mixture expands to about 2,500% of its initial volume to form a stable foam.

EXAMPLE 3

A quasi-prepolymer is prepared by heating a mixture of 5 parts of the Specflex® NC700 copolymer polyol, 5 parts of a hydroxyl-terminated polybutadiene having an average functionality of 2.2 and an equivalent weight of 555; and 44 parts of PAPI® 20 polymeric MDI. The mixture is heated to 70° C. under nitrogen until a constant NCO content of 23.4% is achieved. The resulting liquid quasi-prepolymer has an average isocyanate functionality of 3.3.

The quasi-prepolymer is cooled to approximately room temperature and blended with 30.5 parts of a rubber solution containing 70.89% of Platinol 711P, 3.57% limestone particles and 25.54% of an acrylonitrile/butadiene copolymer rubber, 2.5 parts of dicyanodiamide, 10 parts of sodium perborate tetrahydrate, 2 parts of DC-198 surfactant, and 1 part of the encapsulated dimorpholinodiethyl ether catalyst. The resulting foamable polyurethane composition is a paste that remains in place when applied to a vertical metal surface at 22° C.

Isocyanate index for this formulation is calculated to be approximately 46.7.

The foamable polyurethane composition is expanded by heating to 160° C. for 10 minutes. The mixture expands to about 2,500% of its initial volume to form a stable foam.

EXAMPLE 4

A quasi-prepolymer is prepared by heating a mixture of 12.995 parts of the Specflex® NC700 copolymer polyol, 41.5 parts of PAPI® 20 polymeric MDI and 0.005 parts of an organotin catalyst (Dabco® T-12, from Air Products). The mixture is heated to 70° C. under nitrogen with stirring until a constant NCO content of 22.5% is achieved. The resulting liquid quasi-prepolymer has an average isocyanate functionality of 3.26.

The quasi-prepolymer is cooled to approximately room temperature and blended with 30 parts of a plasticizer (Para Oil 45, from Dover Chemicals), 2 parts of dicyanodiamide, 10 parts of sodium perborate tetrahydrate, 1.5 parts of DC-198 surfactant, and 2 parts of the encapsulated dimorpholinodiethyl ether catalyst. The resulting foamable polyurethane composition is a paste that remains in place when applied to a vertical metal surface at 22° C.

Isocyanate index for this formulation is calculated to be approximately 46.5.

The foamable polyurethane composition is expanded by heating to 160° C. for 10 minutes. The mixture expands to about 3,000% of its initial volume to form a stable foam.

EXAMPLE 5

A quasi-prepolymer is prepared by heating a mixture of 5 parts of the Specflex® NC700 copolymer polyol, 5 parts of the hydroxyl-terminated polybutadiene described in Example 3, and 43 parts of PAPI® 20 polymeric MDI. The mixture is heated to 70° C. under nitrogen with stirring until a constant NCO content of 23% is achieved. The resulting liquid quasi-prepolymer has an average isocyanate functionality of 3.3.

The quasi-prepolymer is cooled to approximately room temperature and blended with 15 parts of a polybutadiene rubber having a $T_g$ of −100° C. (Rubber Solution 110 from Degussa), 15 parts of Para Oil 45 plasticizer, 2.5 parts of dicyanodiamide, 10 parts of sodium citrate dihydrate, 1.5 parts of DC-198 surfactant, 1 part sulfur, 1 part of a rubber accelerator, and 1 part of the encapsulated dimorpholinodiethyl ether catalyst. The resulting foamable polyurethane composition is a paste that remains in place when applied to a vertical metal surface at 22° C.

Sodium citrate dihydrate releases two waters of hydration when heated to a temperature of about 150° C. Isocyanate index for this formulation is calculated to be approximately 117.

The foamable polyurethane composition is expanded by heating to 160° C. for 10 minutes. The mixture expands to about 2,500% of its initial volume to form a stable foam.

What is claimed is:

1. A one-component foamable polyurethane composition comprising
   a) an isocyanate-terminated quasi-prepolymer having an isocyanate content of from 15 to 27% by weight, the quasi-prepolymer having an average isocyanate functionality of from 2.6 to 3.5;
   b) a hydrated sodium citrate salt or potassium citrate salt which hydrated salt loses at least two moles of water of hydration per mole of salt when exposed to at least one temperature in the range of from 100 to 180° C.;
   c) at least one catalyst for the reaction between an isocyanate group and water, wherein the hydrated salt is present in an amount such that at least 0.5 equivalents of water of hydration are provided per equivalent of isocyanate groups in the quasi-prepolymer when the foamable polyurethane composition is heated to at least one temperature in the range of from 80 to 190° C., and
   d) from 20 to 50% by weight of the composition of a plasticizer, rubber or combination thereof.

2. The foamable polyurethane composition of claim 1, wherein the isocyanate index is from 20 to 200.

3. The foamable polyurethane composition of claim 2 wherein the quasi-prepolymer has an isocyanate content of from 20 to 25% by weight and an average isocyanate functionality of from 3.0 to 3.4.

4. The foamable polyurethane composition of claim 1, wherein the catalyst includes at least one tertiary amine compound.

5. A method of making a rigid polyurethane foam, comprising heating a one-component foamable polyurethane composition containing an isocyanate-terminated prepolymer and a hydrated sodium citrate salt or a hydrated potassium citrate salt to a temperature from 100 to 180° C. such that the hydrated salt loses at least two moles of water of hydration per mole of salt and said released water of hydration reacts with isocyanate groups on the isocyanate-terminated prepolymer to expand and cure the composition, wherein
   a) the isocyanate-terminated quasi-prepolymer has an isocyanate content of from 15 to 27% by weight and an average isocyanate functionality of from 2.6 to 3.5;
   b) the hydrated salt loses at least one mole of water per mole of salt when exposed to at least one temperature in the range of 80 to 190° C.,
   c) the composition contains at least one catalyst for the reaction between an isocyanate group and water, and
   d) the one-component foamable polyurethane composition contains from 20 to 50% by weight of a plasticizer, rubber or combination thereof.

6. The method of claim 5, wherein the polyurethane composition expands by at least 1000%.

7. The method of claim 6, wherein the polyurethane composition expands by at least 2000%.

8. The method of claim 7, wherein the polyurethane composition expands by at least 2500%.

* * * * *